(12) United States Patent
Harley et al.

(10) Patent No.: US 10,108,265 B2
(45) Date of Patent: Oct. 23, 2018

(54) CALIBRATION OF HAPTIC FEEDBACK SYSTEMS FOR INPUT DEVICES

(71) Applicants: Jonah A. Harley, Cupertino, CA (US); Peteris K. Augenbergs, Cupertino, CA (US); Patrick Kessler, Cupertino, CA (US); Kenneth L. Staton, Cupertino, CA (US); Dhaval Chandrakant Patel, Cupertino, CA (US); Thomas W. Wilson, Jr., Saratoga, CA (US)

(72) Inventors: Jonah A. Harley, Cupertino, CA (US); Peteris K. Augenbergs, Cupertino, CA (US); Patrick Kessler, Cupertino, CA (US); Kenneth L. Staton, Cupertino, CA (US); Dhaval Chandrakant Patel, Cupertino, CA (US); Thomas W. Wilson, Jr., Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 14/399,671

(22) PCT Filed: May 9, 2013

(86) PCT No.: PCT/US2013/040446
§ 371 (c)(1),
(2) Date: Nov. 7, 2014

(87) PCT Pub. No.: WO2013/170099
PCT Pub. Date: Nov. 14, 2013

(65) Prior Publication Data
US 2015/0130730 A1    May 14, 2015

Related U.S. Application Data

(60) Provisional application No. 61/645,017, filed on May 9, 2012, provisional application No. 61/799,980, filed on Mar. 15, 2013.

(51) Int. Cl.
*G06F 3/01* (2006.01)
*G06F 3/041* (2006.01)

(52) U.S. Cl.
CPC ............ *G06F 3/016* (2013.01); *G06F 3/0414* (2013.01); *G06F 3/0418* (2013.01)

(58) Field of Classification Search
None
See application file for complete search history.

(56) References Cited

U.S. PATENT DOCUMENTS

| 3,176,241 A | 3/1965 | Hogan |
| 4,558,757 A | 12/1985 | Mori |

(Continued)

FOREIGN PATENT DOCUMENTS

| CN | 1659583 | 8/2005 |
| CN | 101477422 A | 7/2009 |

(Continued)

OTHER PUBLICATIONS

"Immersion Announces MOTIV™ Development Platform for Android," retrieved from the Internet: URL:http://ir.immersion.com/releasedetail.cfm?sh_email=no&releaseid=549080, Feb. 10, 2011.

(Continued)

*Primary Examiner* — Patrick Moon
*Assistant Examiner* — Peijie Shen
(74) *Attorney, Agent, or Firm* — Brownstein Hyatt Farber Schreck, LLP

(57) ABSTRACT

An electronic device including a processor, a display screen in communication with the processor, a track pad in communication with the processor including a movable surface that is selectively movable in at least one direction to provide feedback to a user, and a feedback system in communication with the processor including a feedback sensor. The feedback sensor determines a movement char- (Continued)

US 10,108,265 B2
Page 2 acteristic of the movable surface and the processor selectively adjusts at least one setting of the track pad based on the movement characteristic.

19 Claims, 7 Drawing Sheets

(56) References Cited

U.S. PATENT DOCUMENTS

| | | | |
|---|---|---|---|
| 4,577,174 A | 3/1986 | Lemmer | |
| 4,716,393 A | 12/1987 | Logie | |
| 4,897,582 A | 1/1990 | Otten et al. | |
| 5,052,844 A | 10/1991 | Kendall | |
| 5,103,404 A * | 4/1992 | McIntosh | A63B 24/00 |
| | | | 318/568.22 |
| 5,231,336 A | 7/1993 | van Namen | |
| 5,541,372 A | 7/1996 | Baller et al. | |
| 5,734,373 A * | 3/1998 | Rosenberg | A63F 13/06 |
| | | | 345/161 |
| 5,805,138 A | 9/1998 | Brawne | |
| 5,999,168 A * | 12/1999 | Rosenberg | A63F 13/06 |
| | | | 345/161 |
| 6,100,874 A | 8/2000 | Schena et al. | |
| 6,219,038 B1 | 4/2001 | Cho | |
| 6,337,678 B1 * | 1/2002 | Fish | G06F 3/011 |
| | | | 345/156 |
| 6,373,465 B2 * | 4/2002 | Jolly | B62D 5/006 |
| | | | 244/223 |
| 6,388,655 B1 | 5/2002 | Leung | |
| 6,492,979 B1 | 12/2002 | Kent | |
| 6,518,954 B1 | 2/2003 | Chen | |
| 6,747,631 B1 * | 6/2004 | Sakamaki | G01L 1/14 |
| | | | 345/157 |
| 6,816,049 B2 | 11/2004 | Watanabe | |
| 6,937,124 B1 | 8/2005 | Nakamura | |
| 6,940,494 B2 | 9/2005 | Hoshino et al. | |
| 7,031,592 B2 | 4/2006 | Akieda | |
| 7,091,886 B2 | 8/2006 | DePue | |
| 7,152,482 B2 | 12/2006 | Ueno | |
| 7,176,897 B2 | 2/2007 | Roberts | |
| 7,245,293 B2 | 7/2007 | Hoshino et al. | |
| 7,283,120 B2 | 10/2007 | Grant | |
| 7,331,245 B2 | 2/2008 | Nishimura | |
| 7,436,396 B2 | 10/2008 | Akieda | |
| 7,443,384 B2 | 10/2008 | Harada | |
| 7,511,706 B2 | 3/2009 | Schena | |
| 7,525,532 B2 | 4/2009 | Liu et al. | |
| 7,532,202 B2 | 5/2009 | Roberts | |
| 7,557,051 B2 | 7/2009 | Ryu | |
| 7,567,232 B2 | 7/2009 | Rosenberg | |
| 7,639,232 B2 | 12/2009 | Grant et al. | |
| 7,656,393 B2 | 2/2010 | King | |
| 7,685,538 B2 | 3/2010 | Fleck et al. | |
| 7,692,078 B2 | 4/2010 | Hayashi | |
| 7,710,397 B2 | 5/2010 | Krah et al. | |
| 7,791,506 B2 | 9/2010 | Riihimaki | |
| 7,825,903 B2 | 11/2010 | Anastas et al. | |
| 7,877,707 B2 | 1/2011 | Westerman | |
| 7,920,225 B2 | 4/2011 | Nishikawa et al. | |
| 7,924,145 B2 * | 4/2011 | Yuk | G06F 3/03547 |
| | | | 340/407.1 |
| 7,948,337 B2 | 5/2011 | Chu | |
| 7,952,566 B2 | 5/2011 | Poupyrev | |
| 8,013,961 B2 | 9/2011 | Adachi et al. | |
| 8,059,104 B2 | 11/2011 | Shahoian | |
| 8,059,105 B2 * | 11/2011 | Rosenberg | A63F 13/06 |
| | | | 178/18.01 |
| 8,081,156 B2 | 12/2011 | Ruettiger | |
| 8,084,968 B2 | 12/2011 | Murray et al. | |
| 8,117,912 B2 | 2/2012 | Kawakubo | |
| 8,132,468 B2 | 3/2012 | Radivojevic | |
| 8,139,038 B2 | 3/2012 | Chueh | |
| 8,144,129 B2 | 3/2012 | Hotelling | |
| 8,169,332 B2 | 5/2012 | Son | |
| 8,169,401 B2 | 5/2012 | Hardwick | |
| 8,169,402 B2 | 5/2012 | Shahoian et al. | |
| 8,232,969 B2 | 7/2012 | Grant | |
| 8,260,337 B2 | 9/2012 | Periyalwar et al. | |
| 8,264,465 B2 | 9/2012 | Grant et al. | |
| 8,279,175 B2 | 10/2012 | Kim et al. | |
| 8,287,522 B2 | 10/2012 | Moses et al. | |
| 8,291,776 B1 * | 10/2012 | Pickens | G01L 1/125 |
| | | | 73/779 |
| 8,296,670 B2 | 10/2012 | Matthews et al. | |
| 8,310,350 B2 | 11/2012 | Pfau et al. | |
| 8,310,452 B2 | 11/2012 | Takenaka et al. | |
| 8,319,727 B2 | 11/2012 | Norieda | |
| 8,373,664 B2 | 2/2013 | Wright | |
| 8,378,798 B2 | 2/2013 | Bells et al. | |
| 8,378,965 B2 | 2/2013 | Gregorio et al. | |
| 8,400,410 B2 | 3/2013 | Taylor | |
| 8,421,567 B2 | 4/2013 | Eckl et al. | |
| 8,482,381 B2 | 7/2013 | Chatterjee et al. | |
| 8,488,308 B2 | 7/2013 | LeVasseur | |
| 8,502,547 B2 | 8/2013 | Philipp | |
| 8,536,978 B2 | 9/2013 | Coggill | |
| 8,570,162 B2 | 10/2013 | Ujii | |
| 8,570,297 B2 | 10/2013 | Bulea | |
| 8,581,901 B2 | 11/2013 | Joshi | |
| 8,587,542 B2 | 11/2013 | Moore | |
| 8,593,409 B1 * | 11/2013 | Heubel | G06F 3/041 |
| | | | 340/407.1 |
| 8,610,684 B2 | 12/2013 | Kalu et al. | |
| 8,633,901 B2 | 1/2014 | Orr et al. | |
| 8,633,911 B2 | 1/2014 | Schediwy et al. | |
| 8,633,916 B2 | 1/2014 | Bernstein et al. | |
| 8,648,816 B2 | 2/2014 | Homma et al. | |
| 8,686,839 B2 | 4/2014 | Posamentier | |
| 8,686,961 B2 | 4/2014 | Yamano | |
| 8,717,152 B2 | 5/2014 | Bhatia et al. | |
| 8,730,199 B2 | 5/2014 | Sleeman et al. | |
| 8,783,106 B1 * | 7/2014 | Nielson | G01P 15/093 |
| | | | 73/514.19 |
| 8,799,827 B2 | 8/2014 | Hinckley et al. | |
| 8,810,522 B2 | 8/2014 | Tse | |
| 8,830,188 B2 | 9/2014 | Verthein et al. | |
| 8,836,648 B2 | 9/2014 | Wilairat | |
| 8,854,317 B2 | 10/2014 | Homma et al. | |
| 8,884,892 B2 | 11/2014 | Bakker | |
| 8,892,051 B2 | 11/2014 | Yi et al. | |
| 8,898,564 B2 | 11/2014 | Grant | |
| 8,907,661 B2 | 12/2014 | Maier | |
| 8,915,422 B1 | 12/2014 | Harty | |
| 8,976,537 B2 | 3/2015 | Ito | |
| 9,001,060 B2 | 4/2015 | Harris | |
| 9,013,430 B2 | 4/2015 | McCann | |
| 9,030,419 B1 | 5/2015 | Freed | |
| 9,054,627 B2 | 6/2015 | Bosch et al. | |
| 9,086,740 B2 | 7/2015 | Furukawa | |
| 9,110,532 B2 | 8/2015 | Ando et al. | |
| 9,122,325 B2 | 9/2015 | Peshkin | |
| 9,122,345 B2 | 9/2015 | Chen | |
| 9,128,523 B2 | 9/2015 | Buuck | |
| 9,148,190 B1 | 9/2015 | Buuck et al. | |
| 9,158,407 B2 | 10/2015 | Coulson et al. | |
| 9,164,605 B1 | 10/2015 | Pirogov | |
| 9,182,859 B2 | 11/2015 | Coulson et al. | |
| 9,207,801 B2 | 12/2015 | Schediwy et al. | |
| 9,222,693 B2 | 12/2015 | Gourley | |
| 9,223,471 B2 | 12/2015 | Buxton | |
| 9,262,002 B2 | 2/2016 | Momeyer et al. | |
| 9,274,682 B2 | 3/2016 | Hinckley et al. | |
| 9,282,893 B2 | 3/2016 | Longinotti-Buitoni et al. | |
| 9,298,260 B2 | 3/2016 | Karaoguz | |
| 9,304,587 B2 | 4/2016 | Wright et al. | |
| 9,348,473 B2 | 5/2016 | Ando | |
| 9,349,552 B2 | 5/2016 | Huska | |
| 9,360,968 B2 | 6/2016 | Wright | |
| 9,372,543 B2 | 6/2016 | Behles | |
| 9,389,686 B2 | 7/2016 | Zoller | |
| 9,454,256 B2 | 9/2016 | Fisher et al. | |
| 9,798,409 B1 | 10/2017 | Wells et al. | |
| 2004/0080494 A1 | 4/2004 | Fahlman | |

(56) References Cited

U.S. PATENT DOCUMENTS

| | | | |
|---|---|---|---|
| 2004/0190991 A1* | 9/2004 | Quenzi | E01C 19/006 404/118 |
| 2005/0134561 A1* | 6/2005 | Tierling | G06F 3/016 345/156 |
| 2005/0137829 A1* | 6/2005 | Gimelfarb | G01B 11/0683 702/171 |
| 2005/0219206 A1* | 10/2005 | Schena | G06F 3/016 345/156 |
| 2006/0109256 A1* | 5/2006 | Grant | G06F 3/016 345/173 |
| 2006/0123906 A1* | 6/2006 | Honkura | G01P 1/006 73/514.16 |
| 2007/0152966 A1 | 7/2007 | Krah et al. | |
| 2007/0202841 A1* | 8/2007 | Cruz-Hernandez | B06B 1/0215 455/403 |
| 2008/0018611 A1 | 1/2008 | Serban et al. | |
| 2008/0068343 A1 | 3/2008 | Hoshino et al. | |
| 2008/0084384 A1 | 4/2008 | Gregorio et al. | |
| 2008/0111791 A1* | 5/2008 | Nikittin | G06F 3/016 345/163 |
| 2008/0165159 A1 | 7/2008 | Soss et al. | |
| 2008/0191648 A1 | 8/2008 | Ito et al. | |
| 2008/0297478 A1 | 12/2008 | Hotelling et al. | |
| 2009/0002199 A1 | 1/2009 | Lainonen et al. | |
| 2009/0027038 A1* | 1/2009 | Garmire | G01B 9/02 324/95 |
| 2009/0102805 A1* | 4/2009 | Meijer | G06F 3/016 345/173 |
| 2009/0115734 A1* | 5/2009 | Fredriksson | G06F 3/016 345/173 |
| 2009/0167704 A1 | 7/2009 | Terlizzi et al. | |
| 2009/0174672 A1 | 7/2009 | Schmidt | |
| 2009/0189873 A1* | 7/2009 | Peterson | G06F 3/016 345/173 |
| 2009/0225046 A1 | 9/2009 | Kim | |
| 2009/0242282 A1 | 10/2009 | Kim | |
| 2009/0316380 A1 | 12/2009 | Armstrong | |
| 2009/0322183 A1 | 12/2009 | Kawakubo | |
| 2010/0053116 A1 | 3/2010 | Daverman et al. | |
| 2010/0107067 A1 | 4/2010 | Vaisanen | |
| 2010/0108408 A1* | 5/2010 | Colgate | G06F 3/016 178/18.03 |
| 2010/0141408 A1 | 6/2010 | Doy et al. | |
| 2010/0149111 A1 | 6/2010 | Olien | |
| 2010/0149124 A1 | 6/2010 | Kim | |
| 2010/0164959 A1 | 7/2010 | Brown et al. | |
| 2010/0182263 A1 | 7/2010 | Aunio et al. | |
| 2010/0214239 A1 | 8/2010 | Wu | |
| 2010/0225586 A1* | 9/2010 | Cheng | G06F 3/016 345/163 |
| 2010/0225600 A1 | 9/2010 | Dai et al. | |
| 2010/0245254 A1 | 9/2010 | Olien et al. | |
| 2010/0328229 A1 | 12/2010 | Weber | |
| 2011/0006888 A1* | 1/2011 | Bae | A63F 13/00 340/407.1 |
| 2011/0075835 A1* | 3/2011 | Hill | H04M 1/72563 379/418 |
| 2011/0141052 A1* | 6/2011 | Bernstein | G06F 3/016 345/174 |
| 2011/0141053 A1 | 6/2011 | Bulea et al. | |
| 2011/0163985 A1 | 7/2011 | Bae et al. | |
| 2011/0185824 A1* | 8/2011 | Mink | G01L 1/247 73/862.624 |
| 2011/0227872 A1* | 9/2011 | Huska | G06F 3/016 345/174 |
| 2011/0248916 A1 | 10/2011 | Griffin | |
| 2011/0250760 A1* | 10/2011 | Tan | B81C 1/00246 438/712 |
| 2012/0013531 A1 | 1/2012 | Wilson | |
| 2012/0038568 A1 | 2/2012 | Colloms et al. | |
| 2012/0038577 A1* | 2/2012 | Brown | G06F 3/04845 345/173 |
| 2012/0049659 A1* | 3/2012 | Gregory | A63F 13/06 310/15 |
| 2012/0050230 A1 | 3/2012 | Harris | |
| 2012/0062491 A1 | 3/2012 | Coni et al. | |
| 2012/0105367 A1 | 5/2012 | Son et al. | |
| 2012/0133496 A1 | 5/2012 | Aono | |
| 2012/0154315 A1 | 5/2012 | Aono | |
| 2012/0139860 A1 | 6/2012 | Hotelling et al. | |
| 2012/0182238 A1 | 7/2012 | Lee | |
| 2012/0206246 A1 | 8/2012 | Cruz-Hernandez et al. | |
| 2012/0229264 A1 | 9/2012 | Bosch et al. | |
| 2012/0235942 A1* | 9/2012 | Shahoian | G06F 1/1616 345/173 |
| 2012/0249462 A1 | 10/2012 | Flanagan et al. | |
| 2012/0286847 A1* | 11/2012 | Peshkin | G06F 3/016 327/517 |
| 2012/0319987 A1* | 12/2012 | Woo | G06F 3/016 345/174 |
| 2012/0320085 A1* | 12/2012 | Mei | G06F 3/016 345/629 |
| 2012/0326981 A1* | 12/2012 | Kurose | G06F 1/1626 345/160 |
| 2013/0076652 A1 | 3/2013 | Leung | |
| 2013/0083332 A1* | 4/2013 | Heath | G01B 11/06 356/630 |
| 2013/0088341 A1* | 4/2013 | Lim | G06F 3/016 340/407.1 |
| 2013/0127755 A1* | 5/2013 | Lynn | G08B 6/00 345/173 |
| 2013/0154933 A1 | 6/2013 | Sheik-Nainar | |
| 2013/0169424 A1* | 7/2013 | Kujawski | G06F 3/03543 340/407.2 |
| 2013/0179827 A1 | 7/2013 | Eriksson et al. | |
| 2013/0198625 A1* | 8/2013 | Anderson | G06F 3/016 715/701 |
| 2013/0222267 A1 | 8/2013 | Almalki | |
| 2013/0222289 A1 | 8/2013 | Kwak | |
| 2013/0321290 A1 | 12/2013 | Oh | |
| 2014/0002249 A1* | 1/2014 | Lim | G06F 3/016 340/407.1 |
| 2014/0028575 A1 | 1/2014 | Parivar | |
| 2014/0145836 A1 | 5/2014 | Tossavanen et al. | |
| 2014/0176485 A1 | 6/2014 | Holmberg et al. | |
| 2014/0191973 A1 | 7/2014 | Zellers | |
| 2014/0197936 A1 | 7/2014 | Biggs et al. | |
| 2014/0198071 A1 | 7/2014 | Algreatly | |
| 2014/0347289 A1 | 11/2014 | Suh | |
| 2015/0089435 A1 | 3/2015 | Kuzmin | |
| 2015/0109223 A1 | 4/2015 | Kessler et al. | |
| 2015/0116205 A1 | 4/2015 | Westerman et al. | |
| 2015/0155474 A1 | 6/2015 | Tanimoto et al. | |
| 2015/0177899 A1 | 6/2015 | Degner et al. | |
| 2015/0192482 A1 | 7/2015 | Araki | |
| 2015/0227280 A1 | 8/2015 | Westerman et al. | |
| 2015/0234493 A1 | 8/2015 | Parivar et al. | |
| 2015/0242037 A1 | 8/2015 | Pedder et al. | |
| 2015/0301642 A1 | 10/2015 | Hanaur | |
| 2015/0346881 A1 | 12/2015 | Watazu | |
| 2016/0085355 A1 | 3/2016 | Pirogov | |
| 2016/0091972 A1 | 3/2016 | Patel et al. | |
| 2016/0162030 A1 | 6/2016 | Patel et al. | |
| 2016/0162031 A1 | 6/2016 | Westerman et al. | |
| 2016/0188010 A1 | 6/2016 | Wright et al. | |
| 2017/0268942 A1 | 9/2017 | Pedder et al. | |
| 2018/0046307 A1 | 2/2018 | Wells et al. | |

FOREIGN PATENT DOCUMENTS

| | | |
|---|---|---|
| CN | 101482785 | 7/2009 |
| CN | 101523329 | 9/2009 |
| CN | 101763193 A | 6/2010 |
| CN | 101833393 | 9/2010 |
| CN | 101868770 | 10/2010 |
| CN | 102047088 | 5/2011 |
| CN | 102084325 | 6/2011 |
| CN | 102084328 | 6/2011 |
| CN | 102144205 | 8/2011 |
| CN | 102339166 | 2/2012 |

(56) References Cited

FOREIGN PATENT DOCUMENTS

| | | |
|---|---|---|
| CN | 102426490 | 4/2012 |
| CN | 102640093 | 8/2012 |
| CN | 1496549 | 10/2012 |
| CN | 102713805 | 10/2012 |
| CN | 102870080 | 1/2013 |
| CN | 103097990 | 5/2013 |
| DE | 102010007486 | 8/2011 |
| EP | 2077490 | 7/2009 |
| EP | 2202619 | 6/2010 |
| EP | 2320309 | 5/2011 |
| EP | 2357547 | 8/2011 |
| EP | 2375306 | 10/2011 |
| EP | 2381340 | 10/2011 |
| EP | 2395414 | 12/2011 |
| EP | 2648071 | 10/2013 |
| JP | 2007034991 | 2/2007 |
| KR | 101274123 | 6/2013 |
| KR | 20130109288 | 10/2013 |
| TW | 201314541 | 4/2013 |
| WO | WO2012/161061 | 11/2012 |
| WO | WO 13/169299 | 11/2013 |
| WO | WO 13/169303 | 11/2013 |
| WO | WO 13/169305 | 11/2013 |
| WO | WO 13/188307 | 12/2013 |
| WO | WO 14/017407 | 1/2014 |
| WO | WO 14/018111 | 1/2014 |
| WO | WO 15/020663 | 2/2015 |

OTHER PUBLICATIONS

Pava et al., "Real Time Platform Middleware for Transparent Prototyping of Haptic Applications," 2004.
Technifast, "Blind Captive Nuts," Jun. 30, 2013, http://www.technifast.co.uk.
Zordan, Enrico et al., "Principle design and actuation of a dual chamber electromagnetic micropump with coaxial cantilever valves," Biomedical Microdevices, Kluwer Academic Publishers, BO, vol. 12, No. 1, Oct. 17, 2009, pp. 55-62.
International Search Report and Written Opinion, dated Feb. 12, 2014, PCT/US2013/052006, 15 pages.
International Search Report and Written Opinion, dated Apr. 24, 2014, PCT/US2014/013206, 12 pages.
Product Specification Sheet: GEEPLUS, VIBRO1 Vibration Actuator, 2 pages, www,geeplus.biz, downloaded on Jul. 15, 2015.
International Search Report and Written Opinion, dated Oct. 4, 2013, PCT/US2013/040446, 7 pages.
U.S. Appl. No. 15/791,618, filed Oct. 24, 2017, Wells et al.
U.S. Appl. No. 15/797,992, filed Oct. 30, 2017, Kessler et al.

* cited by examiner

CALIBRATION OF HAPTIC FEEDBACK SYSTEMS FOR INPUT DEVICES

CROSS-REFERENCE TO RELATED APPLICATION

This application is a 35 U.S.C. 371 application of PCT/US2013/040446, filed May 9, 2013, and titled "Feedback Systems for Input Devices," which claims priority to U.S. Provisional Application No. 61/645,017, filed May 9, 2012, entitled "Feedback Systems for Input Devices" and to U.S. Provisional Application No. 61/799,980, filed Mar. 15, 2013, entitled "Feedback Systems for Input Devices," each of which is incorporated by reference herein in its entirety.

TECHNICAL FIELD

The present invention relates generally to electronic devices and more specifically, to feedback systems for input devices in electronic devices.

BACKGROUND

Electronic devices may employ haptics to provide the user with tactile output, for example in response to a user input, system state, or application instruction. As a specific example some electronic devices may include a track pad having one or more buttons that depress in response to a user's press. These type of mechanical buttons may include a mechanical dome switch underneath the actual button. The output provided to the user is generated by collapse of the dome switch. Similarly, other haptic devices may include actuators that produce a tactile response by mechanically vibrating or moving the surface of the button. As with a mechanical button, these haptic devices generally provide an output that cannot be varied.

SUMMARY

Examples of embodiments described herein may take the form of a method for calibrating a haptic feedback device for an electronic device. The method includes sensing by at least one feedback sensor a movement characteristic of a movable surface of the haptic output device; determining by a processor whether the at least one movement characteristic is accurate; and if the at least one movement characteristic is not accurate, adjusting at least one characteristic of the haptic output device.

Other embodiments may take the form of an electronic device including a processor, a display screen in communication with the processor, a track pad in communication with the processor including a movable surface that is selectively movable in at least one direction to provide feedback to a user, and a feedback system in communication with the processor including a feedback sensor. The feedback sensor determines a movement characteristic of the movable surface and the processor selectively adjusts at least one setting of the track pad based on the movement characteristic.

Yet other embodiments may take the form of a computing device. The computing device may include a movable surface, a feedback sensor configured to detect a movement characteristic of the movable surface, and a processor in communication with the feedback sensor. The processor is configured to compare the detected movement characteristic with a desired movement characteristic and when the detected movement characteristic does not substantially match the desired movement characteristic, adjust at least one characteristic of the movable surface.

SPECIFICATION

Figure 1:
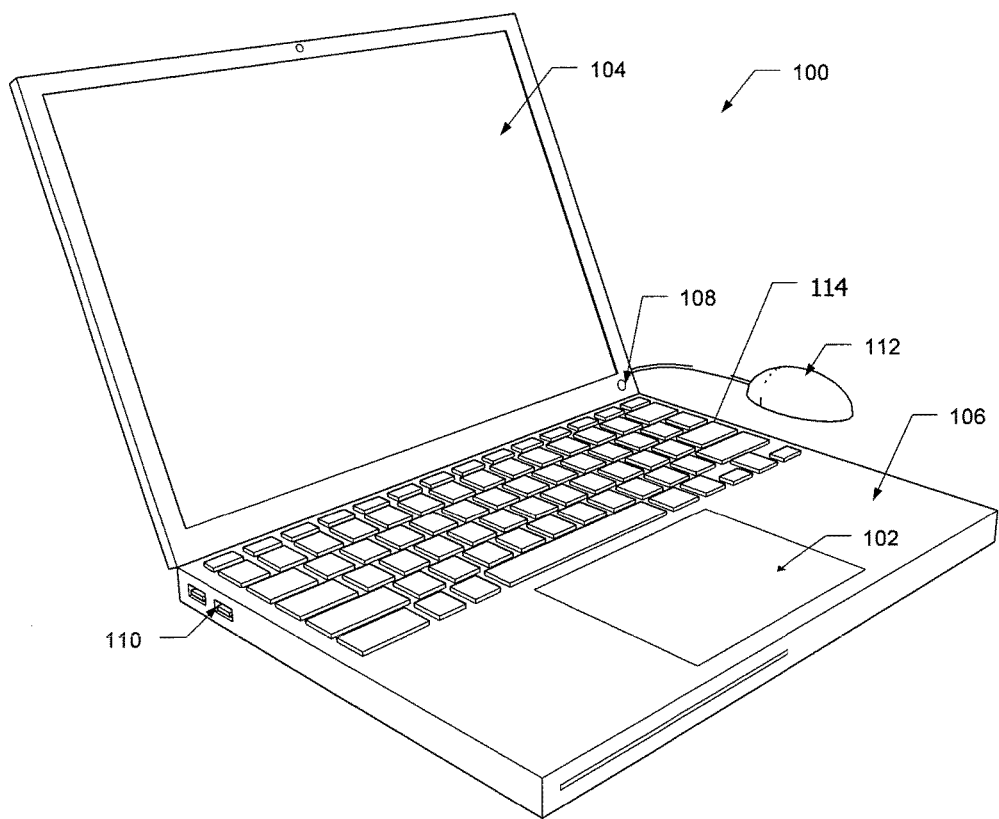
FIG. 1 is a perspective view of an electronic device incorporating a haptic device and a feedback system for the haptic device.

Some embodiments described herein may take the form of a feedback system for haptic actuators and a method for calibrating and adjusting a haptic actuator of an electronic device. The feedback system may calibrate a haptic output device used with computing or electronic devices. Typically, the haptic device may move in one or more directions in order to provide output to the user. For example, the haptic device may have a movable surface that may move horizontally and/or vertically, a predetermined distance at a predetermined speed to provide output to the user. In these instances, the feedback system, which may include one or more feedback sensors, may sense the movements of the haptic device and compare those movements to the predetermined distances and/or speeds desired for the movement of the track pad. Based on the comparison, the movable surface may selectively adjust the output of the haptic device to adjust the haptic device to provide a desired output.

The haptic device may include an actuator to move the movable surface or element in at least one direction to provide output to the user (e.g., in response to a user input or as desired by a program or application). For example, to provide a desired output to a user, a particular input may be provided to the actuator, which may then mechanically move the movable surface in a particular manner. The feedback system may include one or more feedback sensors, such as accelerometers, optical sensors, magnetic or inductive sensors, capacitive sensors, and so on, that may be positioned either on the movable surface of the haptic device or an enclosure for the electronic device or other element adjacent to or otherwise near the movable surface. As the movable surface moves, the one or more sensors (which may be configured to detect one or more characteristics of the surface movement, such as but not limited to, speed, changes in speed, and/or distance) may sense the actual movement of the movable surface and provide that data or information back to a processor. The processor may then calibrate the output of the haptic device based on the information from the sensors.

As one example, the feedback sensors may include one or more accelerometers operably connected to the movable surface of the haptic device to track the acceleration over time of the movable surface. The acceleration may then be used to determine the distance traveled by the movable surface and/or velocity (e.g., by integrating the accelerometer signal). As another example, the movable surface may include a conductive material that may interact with a capacitance sensor attached to a non-moving portion of the haptic device. The capacitance sensor may sense changes in capacitance as the movable surface moves towards and away from the capacitance sensor. The changes in capacitance may then be correlated to changes in position of the movable surface. In another example, the distance moved by the movable surface may be directly measured by a position sensor. Generally, feedback sensors of the movable surface may track or sense the movement of the movable surface, including one or more characteristics of the movement, such as velocity or acceleration.

The sensed movement of the movable surface or element, as detected by the feedback sensors, may be provided to a processor or other similar device, which may then compare the actual movement with a desired movement to determine if the movable surface is providing the desired output. If the actual movement of the movable surface is different from the desired movement, the processor may adjust one or more settings of the haptic device in order to more accurately align the actual movement with the desired movement. For example, in instances where the movable surface is moved by an actuator, the feedback system may adjust an input signal or waveform provided to the actuator or may filter signals provided to the haptic device or actuator to scale the movement up or down. In a specific example, the feedback system may vary the magnitude, duration, or shape of an input waveform provided to an actuator operably connected to the movable surface, thereby changing the haptic output of the haptic output device. The adjustment to the haptic device based on the feedback data may affect subsequent movements of the movable surface and/or current movements (e.g., real-time feedback).

In some instances the feedback system may be incorporated into the haptic device itself or may be separate therefrom. In instances where the feedback system is incorporated into the haptic device or electronic device including the haptic device, the feedback system may be configured to provide feedback on every output of the haptic device or a select group of outputs (e.g., every 10th movement, every other week, or the like). As another example, the feedback system may be activated during a "test mode" or "calibration mode." In this example, the electronic device may selectively actuate the haptic device for purposes of testing, and those actuations may be analyzed by the feedback system to determine if they are accurate. This may allow the feedback system to run on the electronic device and haptic device without substantially reducing processing speed of other applications or programs, because the timing of the test mode or calibration mode may be selected at low-use times (e.g., sleep mode). In many instances the calibration of the haptic device provided by the feedback system may be customized depending on the desired accuracy and/or use patterns of the haptic device.

In instances where the feedback system is outside of the haptic device, the feedback system may test the haptic device prior to installation or assembly of the haptic device itself or assembly of the electronic device. In this manner the haptic device may be calibrated prior to being installed within the electronic device or prior to being sold to a customer. In another example, the feedback system may be separate from the electronic device or haptic device, but may be used to test the haptic device during maintenance or the like during the lifespan of the haptic device.

Electronic Device Incorporating the Haptic Device and Feedback System

The methods and devices described herein may be used with substantially any type of apparatus or device where haptic output is provided through a selectively movable surface or movable element. FIG. 1 is an isometric view of an exemplary electronic device 100 incorporating a haptic output device 102. As shown in FIG. 1, the electronic device 100 may be a laptop computer; however, other electronic devices may implement embodiments described herein. It should be noted that the electronic device 100 illustrated in FIG. 1 is illustrative only and substantially any other type of electronic device, such as, but not limited to, a computer, mobile phone, smart phone, digital music player, digital camera, calculator, personal digital assistant, television, tablet computing device, media player, and so on may be used.

Figure 2:
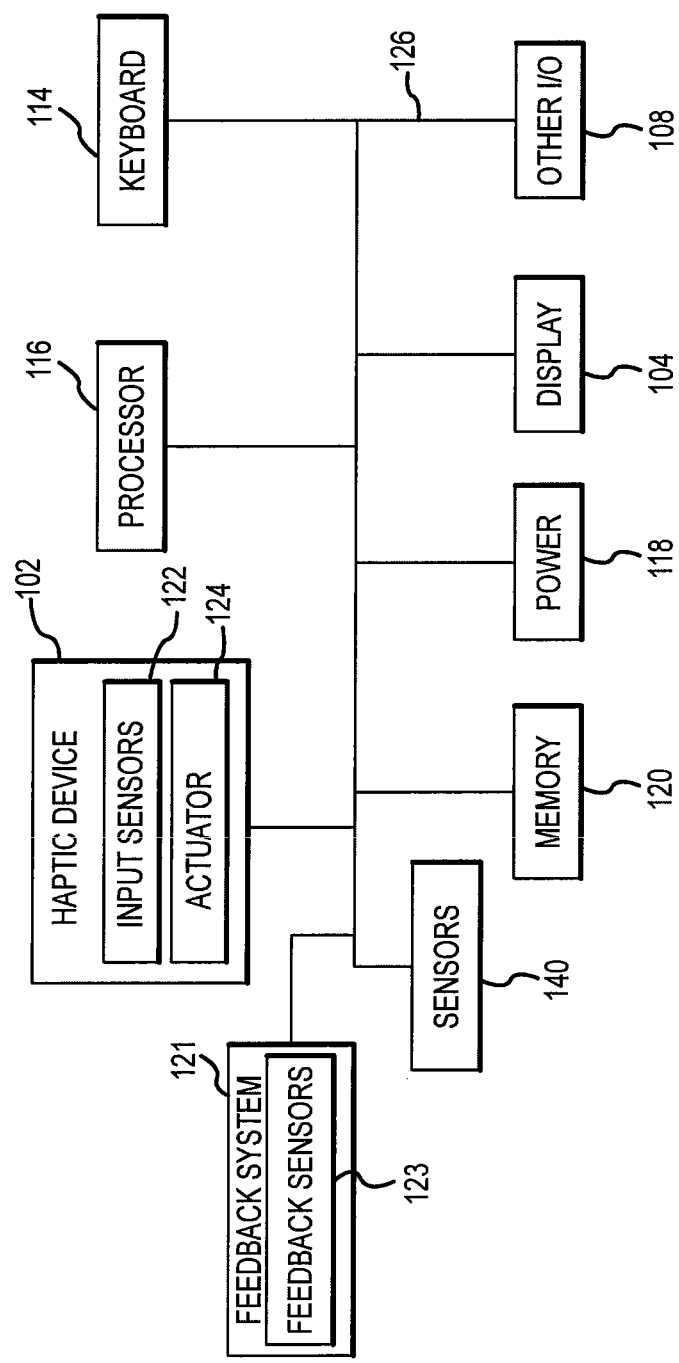
FIG. 2 is a block diagram of the electronic device of FIG. 1.

The electronic device 100 may include the haptic output device 102, an input member 108, a display 104, an input port 110, a keyboard 114 or other input device, one or more sensors 140, and an enclosure 106 at least partially surrounding select or all of the components of the electronic device 100. Additionally, the electronic device 100 may also include a feedback system (an example of which is shown in FIG. 2) to adjust an output of the haptic output device 102.

The input member 108 (which may be a switch, capacitive sensor, or other input mechanism) allows a user to interact with the electronic device 100. For example, the input member 108 may be a button or switch to power on/off the device 100, alter the volume of a speaker, return to a home screen, and the like. The electronic device 100 may include one or more input members 108, and each input member 108 may have one or more input/output functions. Furthermore, as briefly mentioned above, in some embodiments, the input member 108 may be incorporated into the display 104, e.g., a capacitive touch screen as the display 104.

The enclosure 106 may form a portion of an exterior of the electronic device 100 and may at least partially surround select components, such as a processor, memory, and so on, of the electronic device 100. The enclosure 106 may be removable from the device 100, or may be substantially secured around the select components. As will be discussed in more detail below, in some instances, the enclosure 102 may surround a portion of the haptic device 102 and the feedback system may be operably connected to one or more portions of the enclosure 106 in order to sense movements of the movable surface of the haptic output device 102 (see, for example, FIG. 6).

Referring to FIG. 1, the electronic device 100, via the input port 110, may also be in communication with one or more external devices 112. For example, in some embodiments, the haptic output device 102 may be incorporated into an external device 112, such as a mouse, joystick, or other input device.

FIG. 2 is a block diagram of the electronic device 100 including the haptic output device 102 and feedback system 121. The electronic device 100 may include a processor 116, a power source 118, and a memory component 120, all of which may be in communication by one or more system buses 126. The processor 116 may further be in communication with the feedback system 121 and the haptic output device 102. In some embodiments the processor 116 and feedback system 121 may control an actuator 124 for the haptic output device 102 and/or receive data from one or more input sensors 122 of the haptic output device 102, discussed in more detail below. The feedback system 121 may be incorporated into the electronic device 100, into the haptic output device 102, into portions of each, or separate therefrom.

The processor 116 may be substantially any electronic device cable of processing, receiving, and/or transmitting instructions. For example, the processor 116 may be a microprocessor or a microcomputer. Additionally, it should be noted that the processor 116 may include more than one processing member. For example, select components of the electronic device 100 may be controlled by a first processor and other components of the electronic device 100 may be controlled by a second processor, where the first and second processors may or may not be in communication with each other. Continuing with this example, one processor may be included as part of the feedback system 121 and/or the haptic output device 102 to control those elements, whereas a second processor may control aspects of the electronic device 100.

The memory 120 may store electronic data that may be utilized by the electronic device 100. For example, the memory 120 may store electrical data or content e.g., audio files, video files, document files, and so on, corresponding to various applications. In some embodiments, the memory 120 may store user settings with respect to the haptic output device 102, these type of settings is discussed in more detail below. The memory 120 may be, for example, non-volatile storage, a magnetic storage medium, optical storage medium, magneto-optical storage medium, read only memory, random access memory, erasable programmable memory, flash memory, or a combination of one or more types of memory components.

The electronic device 100 may also include one or more sensors 140, in addition to the input sensors 122 of the haptic output device 102 and feedback sensors 123 of the feedback system 121. The sensors 140 may provide substantially any type of input to the electronic device 100. For example, the sensors 140 may be one or more accelerometers, gyroscopes, light sensors, image sensors (such as a camera), force sensors, and so on.

As will be discussed in more detail below, the haptic output device 102 may include one or more input sensors 122, a movable surface, and an actuator 124. The input sensors 122 may be used to sense inputs to the haptic output device 102, such as a user force or position of one or more user's fingers. For example, the input sensors 122 may be force sensors, capacitive sensors, position sensors, and/or the like. The actuator 124 may be used to activate a movable surface in order to move the movable surface to provide output to a user. In some instances the actuator 124 may respond to one or more input waveforms to vary the movement of the movable surface.

Also as discussed in more detail below, the feedback system 121 may include one or more feedback sensors 123. The feedback sensors 123 may configured to detect changes in position, acceleration, or velocity of the movable surface, which will be discussed in more detail below. The feedback system 121, in particular the feedback sensors 123, may be in communication with the processor 116 and the haptic output device 102 via the system bus 126 and/or other communication means. In this manner, the feedback system 121 may detect output of the haptic output device 102 and may calibrate or otherwise vary the haptic output device 102 depending on the desired output.

It should be noted that FIGS. 1-2 are exemplary only. In other examples, the electronic device may include fewer or more components than those shown in FIGS. 1-2. Additionally, the illustrated electronic devices are only exemplary devices incorporating the haptic output device 102. In other embodiments, the haptic output device 102 may be incorporated into substantially any type of device where haptic output to a user may be desired. In some instances, the haptic output device 102 and the feedback system 121 may be a separate component from the electronic device 100 but may be in communication therewith. For example, the haptic output device 102 and/or feedback system 121 may include a transmitting and/or receiving member to transmit data and/or power to the electronic device 100 wirelessly or through a wired connection.

The Haptic Device

Figure 3:
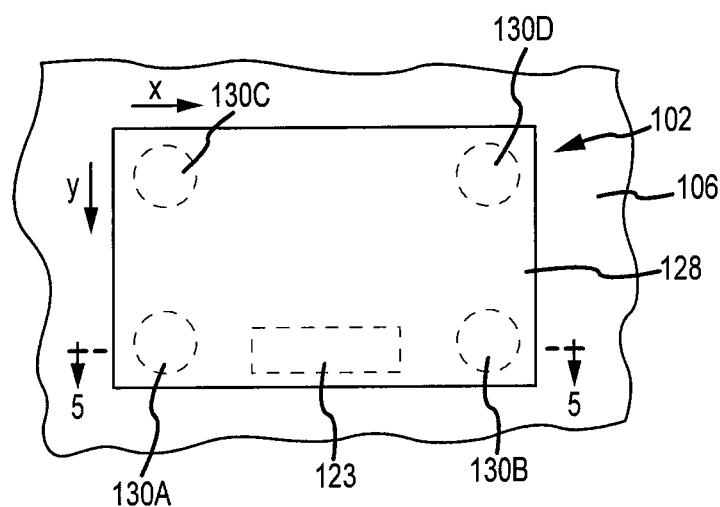
FIG. 3 is an enlarged top plan view of the haptic device of FIG. 1.
Figure 4:
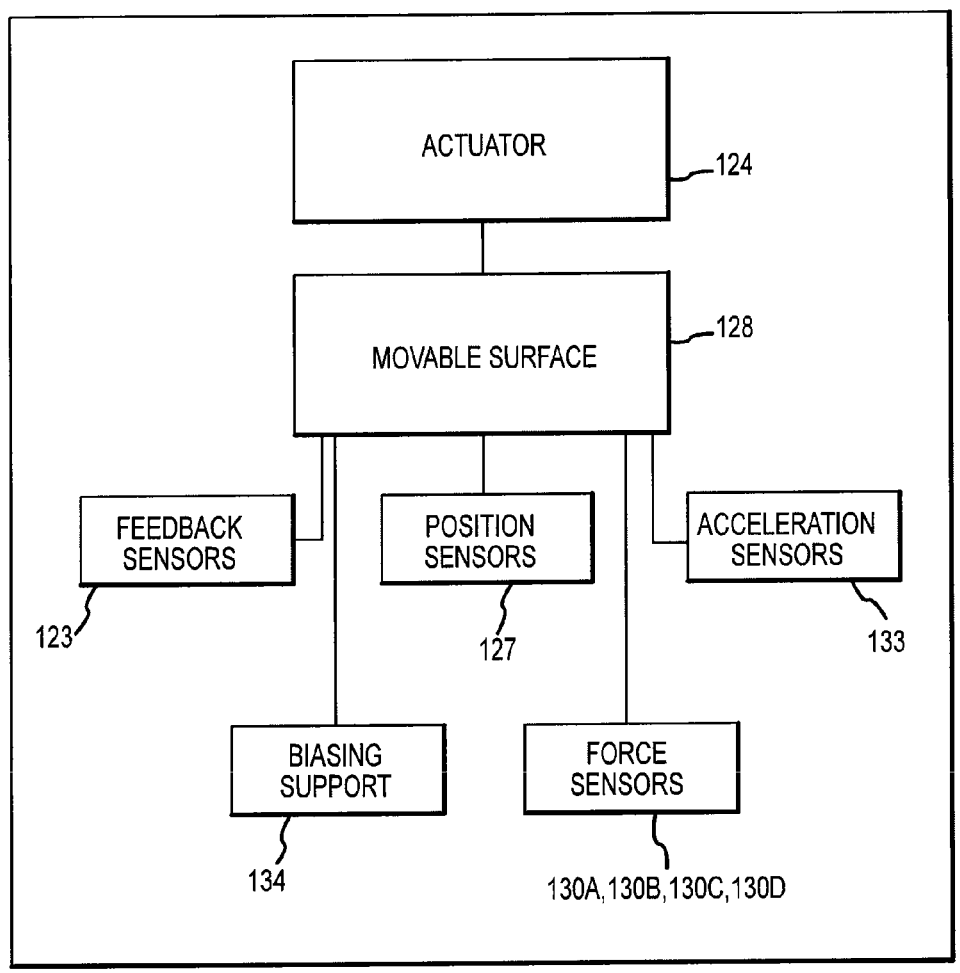
FIG. 4 is a simplified block diagram of the haptic device and feedback system of FIG. 1.
Figure 5:
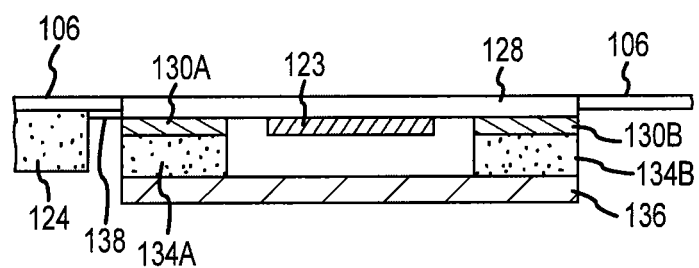
FIG. 5 is a cross-sectional view of the electronic device of FIG. 1 taken along line 5-5 in FIG. 3 illustrating a first embodiment of the feedback system.

The haptic output device 102 will now be discussed in more detail. FIG. 3 is an enlarged top plan view of the electronic device 100 illustrating the haptic output device 102 and the feedback sensors 123 in dashed lines. FIG. 4 is a block diagram of the haptic output device 102 including the feedback system 121 and sensors 123. FIG. 5 is a cross-sectional view of the haptic output device 102 and feedback system 121 of FIG. 3 taken along line 5-5 in FIG. 3. The haptic output device 102 selectively provides output to a user by moving, vibrating, or otherwise alternating a movable surface 128. The feedback system 121 may sense the actual output of the haptic output device 102 and may then adjust the haptic device 102 to adjust the output as desired.

The haptic output device 102 may include the actuator 124 which is operably connected to the movable surface 128. Additionally, the haptic output device 102 includes the input sensors 132 which may include one more force sensors 130A, 130B, 130C, 130D, one or more position sensors 127, and/or one or more acceleration sensors 133. The haptic output device 102 may also include one or more biasing supports 134A, 134B, 134C, 134D to secure and support the haptic output device 102 to the electronic device 100.

The haptic output device 102, when included within the electronic device 100, may be substantially surrounded by the enclosure 106. The haptic output device 102 may include a movable surface 128 supported by one or more biasing supports 134A, 134B, 134C, 134D above a substrate 136 or other support surface for the electronic device 100. The input sensors 122 may be positioned beneath, adjacent, or on top of the movable surface 128. In some embodiments, the input sensors 122 may be integrated into the movable surface 128.

The haptic output device 102 may further be operably connected to the actuator 124. The actuator 124 selectively moves the movable surface 128 to provide feedback to a user. The actuator 124 may be operably connected to the movable surface 128 by one or more connection members 138. The actuator 124 may be a motor, such as a solenoid actuator, and the mechanical output of the actuator 124 may be varied by varying one or more waveform inputs or signals into the actuator 124. As another example, the actuator 124 may be an electromagnet, or a series of magnets, that are selectively energized to attract and repel the movable surface 128.

The actuator 124 may receive one or more electrical signals from the processor 116 or other controlling element and those signals may be converted into mechanical movement by the actuator 124. For example the actuator 124 may be a solenoid actuator including a wire wound around a moveable iron core. As a current passes through the wire coil, the iron core may move correspondingly. Specifically, the electric current through the wire may create a magnetic field. The magnetic field may then apply a force to the core or plunger, to attract the core. In these embodiments, the actuator 124 may also include a spring or biasing member which may return the core to its original position after the magnetic field is removed. However, in other embodiments, the actuator 124 may be other types of motors that may translate electrical signals into a mechanical movement or movements.

In embodiments where the actuator 124 is a solenoid or magnet, the actuator 124 may be configured to respond to one or more waveforms, which may vary the output of the actuator 124. For example, by varying the magnitude, duration, and/or shape of an input waveform, the current through the wire may be altered, thus varying the magnetic field. By changing the magnetic field different types of linear mechanical movements may be created. As a specific example, by changing the amplitude of the input signal, the actuator 124 may move the movable surface 128 an increased amount compared to a lower amplitude input signal. It should be noted that in other embodiments, the actuator 124 may be a motor, servo, or the like that may be used to move the movable surface 128.

In some embodiments, the actuator 124 may selectively move the movable surface 128 linearly, e.g., along the X axis and/or the Y axis illustrated in FIG. 3. In these embodiments, the movable surface 128 may translate horizontally but may not move vertically with respect to the enclosure 106. In other embodiments, the actuator 124 may move the movable surface 128 vertically or a combination of vertically and linearly. However, in embodiments where the actuator 124 may move the movable surface 128 linearly, a user in contact with the movable surface 128 may perceive the movement of the movable surface 128 as being vertical in nature. This is because the movable surface 128 may move linearly a small distance or may move very quickly. Sufficiently small lateral displacements can be experienced by the user as vertical movement. Such embodiments may have a thinner height than a haptic output device employing vertical displacement.

In some embodiments, the actuator 124 may move the movable surface 128 in more than one direction. For example, the actuator 124 may displace the movable surface 128 and then provide a second force to return the movable surface 128 to its original position in the opposite direction. In these instances, the feedback system 121 may alter both movements of the actuator 124 in order to calibrate the haptic output device 102. However, in other embodiments, the biasing supports 134A, 134B, 134C, 134D may provide a biasing force to return the movable surface 128 to its original position. In these instances, depending on whether the biasing supports 134A-134D are adjustable, the feedback system 121 may calibrate the actuator 124 only to adjust the output of the haptic output device 102. However, if the biasing supports 134A-134D are adjustable, they may also be adjusted by the feedback system 121.

With reference to FIGS. 3 and 5, in some embodiments, the movable surface 128 may be a relatively rectangular shape or square shape and a force sensor 130A, 130B, 130C, 130D may be positioned beneath each corner or adjacent each corner of the feedback platform 128. In these embodiments, the force sensors 130A, 130B, 130C, 130D may determine a force input applied to substantially any portion of the movable surface 128. The force sensors 130A, 130B, 130C, 130D may be substantially any type of sensor capable of detecting an exerted force. In some embodiments, the force sensors 130A, 130B, 130C, 130D may be strain gauges.

In other embodiments, the movable surface 128 may be differently shaped and/or may include fewer or more force sensors 130A, 130B, 130C, 130D. For example, the haptic output device 102 may include a single force sensor positioned at a center of the movable surface 128 and/or may include multiple force sensors positioned around a perimeter of the movable surface 128. The location and number of the force sensors 130A, 130B, 130C, 130D may be determined based on the desire sensitivity of force input desired to be captured by the haptic output device 102, among other criteria. Thus, if a more force sensitive haptic output device 102 is desired, more force sensors 130A, 130B, 130C, 130D may be included.

The position or touch sensors 127 may be configured to detect an input location on the movable surface 128. In some embodiments, the position sensors 127 may be one or more capacitive sensors configured to detect multiple touches on the movable surface 128. For example, the haptic output device 102 may include a grid of electrodes operably connected to the movable surface 128 and configured to detect an input signal, such as a change in capacitance or other electrical change. Capacitive sensing grids for sensing changes in capacitance are generally known in the art. However, in other embodiments other position sensors may be used, such as a light sensors that detect disruption in light signals, piezoelectric sensors positioned on the movable surface 128, or acoustic sensors which detect position based on sound waves, and so on.

The acceleration sensor 132 may detect an acceleration of a user input. For example, the acceleration sensor 132 may be an accelerometer that detects how quickly a user may press on the movable surface 128. It should be noted that the feedback system 121 may also include acceleration sensors, which may be either separate from the acceleration sensors 132 of the haptic output device 102 or may be the same as those sensors.

With reference to FIG. 5, the biasing supports 134A, 134B, 134C, 134D may support and operably connect the haptic movable surface 128 to the substrate 136 or other support surface of the electronic device 100. In some embodiments, the haptic output device 102 may include four biasing supports 134A, 134B, 134C, 134D which each may be operably connected to a respective corner of the movable surface 128. In these embodiments, the biasing supports 134A, 134B, 134C, 134D may be operably connected to the movable surface 128 at a location substantially adjacent to the location of the force sensors 130A, 130B, 130C, 130D.

The biasing supports 134A, 134B, 134C, 134D provide a biasing force to the movable surface 128 to return the movable surface 128 to a normal or first position. The biasing supports 134A, 134B, 134C, 134D may be substantially any member capable of providing a biasing or return force to the movable surface 128. In some embodiments, the biasing supports 134A, 134B, 134C, 134D may be relatively flexible and resilient members, such as a gel, including but not limited to, a silicone based gel that may be positioned around the sides of the movable surface 128. In other embodiments, the biasing supports 134A, 134B, 134C, 134D may be one or more springs spanning between the substrate 136 and the movable surface 128, or the haptic device may include a magnetic force which may return the movable surface 128 to its original position.

Generally, the biasing supports 134A, 134B, 134C, 134D may deform or flex when the actuator 124 applies a force to the movable surface 128 and then may return the movable surface 128 to its original position. For example, after the actuator 124 has stopped providing a return force to the movable surface 128, the biasing support 134 may resiliently return to the normal position. In other words, the biasing supports 134A, 134B, 134C, 134D may provide a force to the movable surface 128 to move the movable surface 128 in a second direction D2. As the biasing supports 134A, 134B, 134C, 134D return to their original shape, the movable surface 128 may be positioned in the original or normal position.

It should be noted that although the biasing supports 134A, 134B, 134C, 134D are shown as four separate members, in some embodiments, the biasing supports 134A, 134B, 134C, 134D may be a single integral member. In other embodiments, one or more of the biasing supports 134A, 134B, 134C, 134D may be omitted and the haptic output device 102.

The operation of the haptic output device 102 will now be discussed. The haptic output device 102 may vary the output sensed by the user based on one or more characteristics, settings, or the like. A force input provided by a user to the movable surface 128 may be detected by the one or more force sensors 130A-130D, position sensors 127, and/or acceleration sensors 133. As the input is detected or if an output is otherwise desired, the haptic output device 102 or the processor 116 may determine the desired output. Based on the desired output, an input signal may be provided to the actuator 124, which may then actuate the movable surface 128 to move in at least one direction at a predetermined velocity. As the movable surface 128 moves, the user (who's fingers may be positioned on the movable surface 128) may feel the movement, and receive output from the haptic output device 102. The movement speed of the movable surface 128, as well as the displacement may be varied by varying the input signals to the actuator 124.

The Feedback System

The feedback system 121 for the haptic output device 102 will now be discussed in more detail. As discussed above, the haptic output device 102 may be configured to vary a movement of the movable surface 128 in order to vary the output provided to a user. In some instances, the actual movement of the movable surface 128, either its displacement and/or speed, may be different from the desired movement of the movable surface 128. The feedback system 121 may be configured to determine the actual movement of the movable surface 128 and compare that movement to the desired movement, and adjust the haptic output device 102 as necessary or desired.

With reference again to FIGS. 3-5, the feedback system 121 may be in communication with the haptic output device 102 and may include one or more feedback sensors 123. The feedback sensors 123 may be substantially any type of sensor that may detect a displacement of the movable surface 125 or velocity, or changes thereof. For example, the feedback sensors 123 may be accelerometers, optical sensors, capacitive sensors, strain gauges, magnetic sensors, and so on. Different embodiments of the feedback system 121 utilizing different types of feedback sensors 123 will be discussed in more detail below. The feedback system 121, and specifically, the feedback sensors 123, may be in communication with the processor 116 and/or haptic output device 102 in order to provide a feedback loop between an output of the haptic output device 102 and an input to the haptic output device 102. However, it should be noted that, in some embodiments, the feedback system 121 may be in communication with another component, such as an external electronic device, which may then be used to calibrate or otherwise vary the haptic output device 102. For example, the feedback system 121 may be used during an assembly process of the electronic device 100 to provide an initial calibration of the haptic output device 102 prior to installation. In these instances, the feedback system 121 may be separate from the electronic device 100, but may be used to manually or electrically adjust the haptic output device 102.

In a first example feedback system 121, one or more feedback sensors 123 may be operably connected to the movable surface 128. With reference to FIG. 5, the feedback sensor 123 may be operably connected to a bottom surface of the movable surface 128 in order to detect one or more movements of the movable surface 128. In this example, the feedback sensor 123 may be an accelerometer which may detect an acceleration of the movable surface 128 as it is activated by the actuator 124. In other words, as the movable surface 128 is moved linearly (or otherwise) by the actuator 124, the feedback sensor 123 may detect changes in acceleration of the movable surface 128. As a specific example, the feedback sensor 123 may be a micro electro-mechanical (MEMS) accelerometer. For instance, one type of MEMS accelerometer may include a cantilever beam having a mass attached thereto, and during acceleration the mass deflects from its original position and the deflection is measured by the accelerometer. However, many other types of sensors may be used, including various types of accelerometers.

In embodiments where the feedback sensor 123 may be an accelerometer (as well as in other embodiments), the sensor 123 may be positioned substantially anywhere on the movable surface 128 since generally the acceleration of a movable surface 128 may be approximately the same across the area of the movable surface. Additionally, in many instances, accelerometers, such as MEMS accelerometers, may be relatively inexpensive as well as may have a relatively small size, which may allow for the electronic device 100 and/or haptic device 102 to be thinner and/or smaller, while also not requiring a significant increase in cost to include elements of the feedback system 121 therein.

The changes in acceleration detected by the feedback sensor 123 may be used to determine a movement distance of the movable surface 128 and/or the velocity of the movable surface 128 during the acceleration. For example, the feedback sensor 123, or the haptic output device 102 itself, may detect the acceleration time as well as the acceleration force. Using the time of acceleration, as well as the known acceleration, the velocity and the distance moved by the movable surface 128 may be determined. Velocity of the movable surface 128 may be determined by integrating the signal from the accelerometer over the movement time, and the distance moved by the movable surface 128 may be determined by twice integrating the accelerometer signal over the movement time.

As another example, the feedback sensor 123 illustrated in FIG. 5 may be a strain gauge having one end operably connected to one side of the enclosure 106 surrounding the movable surface 128 and a second end operably connected to the movable surface 128. In this manner, as the movable surface 128 moves, the strain gauge may be pulled or compressed correspondingly, which may vary an output signal of the strain gauge in a manner correlated to the amount of movement of the movable surface 128.

Figure 6:
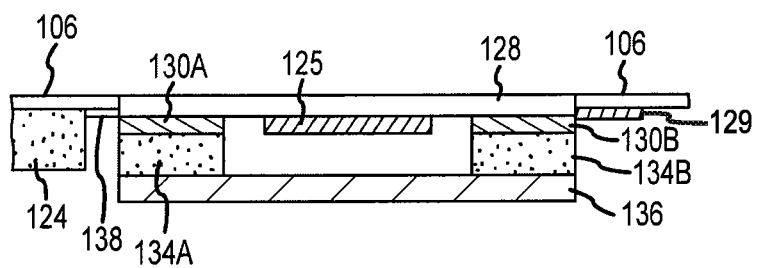
FIG. 6 is a cross-sectional view of the electronic device of FIG. 1 taken along line 5-5 in FIG. 3 illustrating a second embodiment of the feedback system.

In some instances the feedback system 121 may include one or more components that are separate from the movable surface 128, but may interact with one of the feedback sensors 123, the movable surface 128, or other portions of the haptic output device 102 in order to detect the actual movement characteristics of the movable surface 128. FIG. 6 is a cross-sectional view of the haptic output device 102 (including the feedback system 121) taken along line 5-5 in FIG. 3. In this example, the feedback system 121 may include a first sensor 125 connected to the movable surface 128 and a second sensor 129 operably connected to the enclosure 106 adjacent to at least one portion of the movable surface 128. In this example, the second sensor 129 may track changes in position of the first sensor 125, which because the first sensor 125 is operably connected to the movable surface 128, may track the changes in position of the movable surface 128. It should be noted that in some instances either the first sensor 125 or the second sensor 129 may be an element or component that the other sensor can track. In other words, the term sensor is meant to encompass sensing components as well as components the can be sensed by a sensing component. As an example, the first sensor 125 may be a conductive material and the second sensor 129 may be a circuit configured to register changes in capacitance and thus one of the two sensors 125, 129 may not act to actually sense any characteristics, but may be used by the other sensor to track changes in the movement characteristics.

As an example of the feedback system 121 of FIG. 6, the first sensor 125 may be a conductive material (or another type of material having a dielectric property different than air) and the second sensor 129 may be a capacitive sensing circuit that may sense changes in capacitance. The second sensor 129 may be operably connected to the enclosure 106 at a side toward which or away from where the movable surface 128 may move during typical movements by the actuator 124. Thus, as the movable surface 128 moves, a gap between the two sensors 125, 129 may correspondingly increase or decrease, which will alter the capacitance detected by the second sensor 129. These capacitance changes may be used by the processor 116 to determine to motion of the movable surface 128. As a specific example, with reference to FIG. 3, if the movable surface 128 is configured to move along the Y direction, the second sensor 129 may be operably connected to the enclosure 106 along the X axis or horizontal edge of the haptic output device 102. In this configuration, the movable surface 128 may move vertically along the Y axis and move vertically away from or towards the horizontal edge along the X axis.

As another example of the feedback system of FIG. 6, the first sensor 125 may be a conductive or metallic object and the second sensor 129 may be an electromagnet. In this example, the first sensor 125 may be incorporated into or operably connected to the movable surface 128 and may move towards or away from the second sensor 129 which may be operably connected to the enclosure 106. As this occurs, the magnetic field produced by the second sensor 129 may be varied and may be sensed by the second sensor 129. In other examples, the sensors 125, 129 may be configured to act as linear Hall Effect sensors, which may detect changes in magnetic field across known linear distances in order to detect movement of the movable surface 128.

As yet another example of the feedback system of FIG. 6, either the first sensor 125 or the second sensor 129 may be an optical sensor which may detect changes in position of the movable surface 128. In this example one of the sensors 125, 129 may be omitted or may be used as the detection element for the optical sensor. As a specific example, the second sensor 129 may emit a light beam, such as a laser beam or a light from a light emitting diode, and the light beam may be configured to reflect off of a portion of the movable surface 128 and/or first sensor 125 (if included). As the movable surface 128 moves, the reflected angle of the beam changes and the second sensor 128 may receive the light at different angles, which may then be correlated to changes in position of the movable surface 128.

It should be noted that FIGS. 3-6 are illustrative only and are not meant to be limiting. For example, although in FIG. 6 the first sensor 125 is illustrated as being in a middle portion of the movable surface 128 towards an edge of the enclosure 106, in other instances, the first sensor 125 may be positioned between the first force sensor 130A and the third force sensor 130C along another edge of the movable surface 128. Additionally, the feedback sensors 123, 125, 129 may be substantially any other type of sensor that may detect one or more characteristics of the movement of the movable surface 128, such as but not limited to, sensors that can detect the speed, rotation, linear movement, and/or vertical movement (if any) of the movable surface 128. Accordingly, the discussion of any particular sensing technique and/or sensors is meant as illustrative only and not meant as limiting.

Operation of the Feedback System

Figure 7:
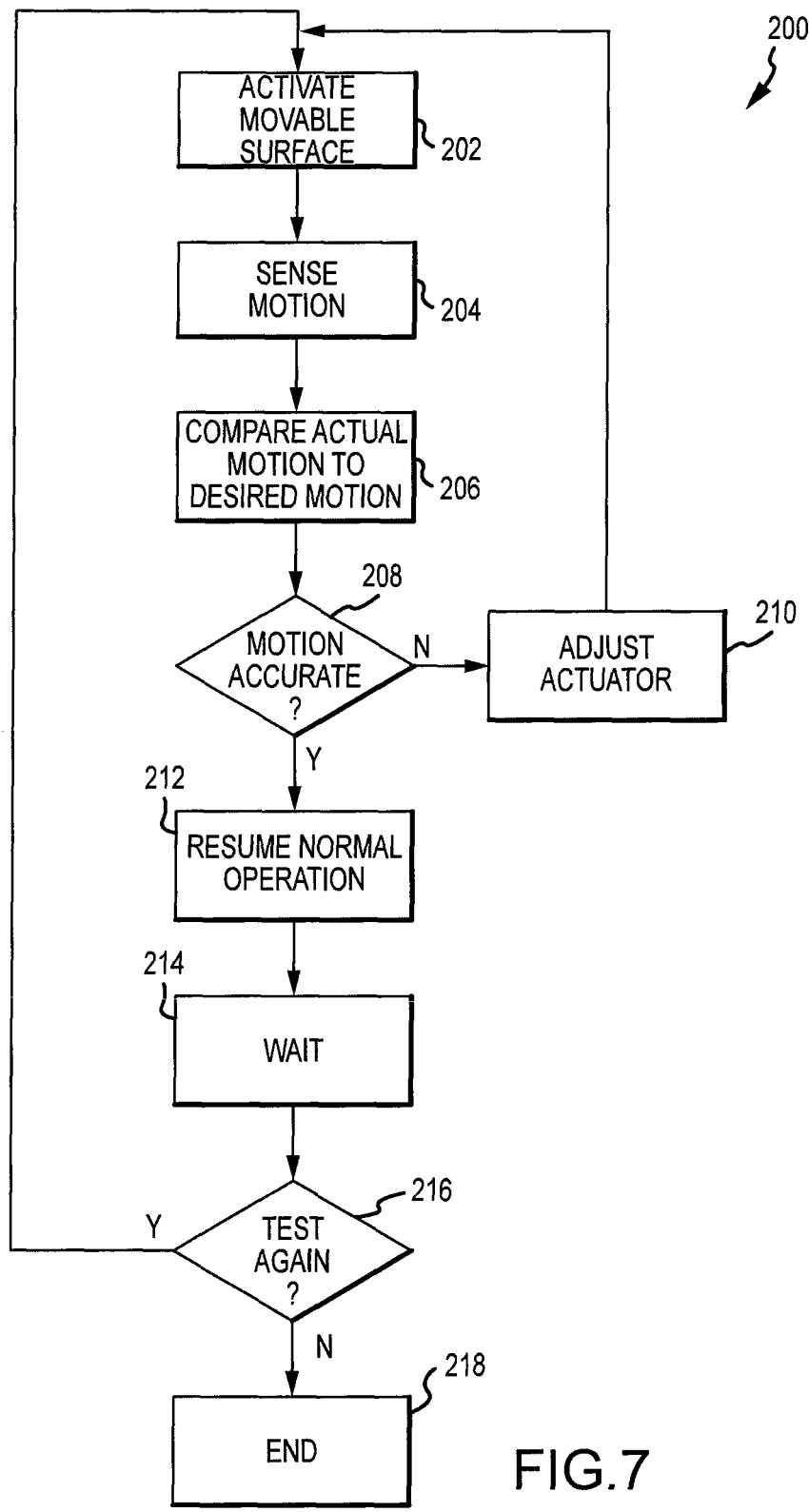
FIG. 7 is a flow chart illustrating a method for selectively adjusting the haptic device of FIG. 1 using the feedback system.

The operation of the feedback system 121 to detect and correct changes in the haptic output device 102 will now be discussed in more detail. FIG. 7 is a flow chart illustrating an exemplary method for using the feedback system 121 to calibrate the haptic output device 102. The method 200 may begin with operation 202 and the haptic output device 102 may activate the movable surface 128. As discussed above with respect to FIGS. 3-5, the movable surface 128 may be activated in response to a user input or to otherwise provide output to a user. To provide output the actuator 124 may move the movable surface 128 a predetermined distance at a predetermined speed. For example, the actuator may move the movable surface 128 linearly relative to the enclosure 102 along a first direction.

As the movable surface 128 is actuated, the method 200 may proceed to operation 204 and the feedback sensors 123, 125, 129 may sense the motion (or one or more characteristics of the motion) of movable surface 128. For example, if the feedback sensor 123 is an accelerometer, the feedback sensor 123 may detect changes in acceleration as a function of time and use that information to determine one or more movement characteristics (e.g., velocity, position, or acceleration) of the movable surface 128 during the activation time. As another example, the feedback sensors 125, 129 may directly measure changes in position of the movable surface 128, e.g., through an optical sensor.

After the feedback sensors 123, 125, 129 have detected one or more characteristics of the movement of the movable surface 128, the method 200 may proceed to operation 206. In operation 206 the processor 116 may compare the detected characteristic(s) with the desired characteristic(s). The desired characteristics may be the expected movement distance, speed, or the like of the movable surface 128 and may be determined based on the input signals to the actuator 124 or otherwise provided to the haptic output device 102. The detected characteristics correspond to the actual movement characteristics of the movable surface 128. It should be noted that in some embodiments, the characteristics sensed by the feedback sensors 123, 125, 129 may have to be modified or analyzed prior to comparing them to the desired characteristics. For example, in some instances, in operation 206 the feedback sensor 123 may be an accelerometer sensing a change in acceleration. In this example, the processor 116 may (double) integrate a signal from the accelerometer (acceleration signal) as a function of the time to determine the distance actually moved by the movable surface 128 prior to comparing the actual distance with the desired distance. However, in other examples, signals from the feedback sensors 123, 125, 129 may be directly compared to the desired movement signals.

After the actual movement characteristics have been compared to the desired characteristics, the method 200 may proceed to operation 208 and the processor 116 may determine whether the motion by the movable surface 128 is accurate. That is, the processor 116 may determine whether the actual movement of the movable surface 128 was the same, or within a predetermined range, as the desired movement. The predetermined range may be a set error range defining differences between the actual movement of the surface 128 and the desired movement that may still be considered to be accurate, although they may not be exactly the same as the desired movement. However, it should be noted that in some instances, the error range may be very small or may be eliminated such that the actual movement of the movable surface 128 may only be considered accurate if it exactly matches the desired movement.

If the movement of the movable surface 128 is inaccurate, the method 200 may proceed to operation 210. In operation 210 the electronic device 100 may adjust the actuator 124 or other adjustable elements of the haptic output device 102. For example, input signals to the actuator 124 may be varied in magnitude, duration, shape or may otherwise be filtered or scaled to vary the output of the actuator 124. In this example, the haptic output device 102 output may be changed by varying the input to the actuator 124 itself. However, in other examples, other mechanisms for varying the output of the haptic output device 102 may be used to calibrate the device 102 utilizing the feedback system 121.

In some instances operation 210 may be performed to adjust the haptic device 102 to modify the next or subsequent output. In other words, subsequent movements of the movable surface 128 may be adjusted based on the accuracy of a prior movement or movements. In these instances, the adjustment may be based on system discrepancies in the movement of the surface 128 generally (e.g., reduce displacement by one-fourth), rather than discrete values (e.g., reduce displacement by 0.3 mm). However, in other instances, the feedback system 121 may be configured to provide substantially real-time feedback and make adjustments to the current movement of the movable surface 128 based on the feedback loop provided by the feedback system 121. In embodiments where real-time feedback may be desired, it should be noted that the haptic device 102 may require a dedicated processor or other controlling element to make the substantially instantaneous changes in output that may be required.

As briefly described above, in some instances, the feedback system 121 may include components outside of the electronic device 100. In these instances, a separate component or computing device may be used to adjust the haptic output device 102, and specifically the actuator 124, in order to adjust the output of the haptic output device 102. This type of adjustment may be done prior to assembling the electronic device 100, whereas the other types of adjustments may be done while the electronic device 100 is operating and/or after it is assembled.

If the movement of the movable surface 128 is determined to be accurate, the method 200 may proceed to operation 212. In operation 212, the haptic output device 102 and/or electronic device 100 may resume normal operation. For example, the feedback system 121 may selectively test the haptic output device 102 and during normal operation the haptic output device 102 may operate without the movement of the movable surface 128 being detected. During normal operation, the method 200 may proceed to operation 214 and the haptic output device 102 may wait for a predetermined period of time prior to activating the feedback system 121 a second time. The wait period may be a set number of inputs to the haptic output device 102, a set number of hours or days, or may be random. In other instances, the wait period may be omitted.

After operation 214, the method 200 may proceed to operation 216 and the processor 116 may determine whether the feedback system 121 should test the haptic output device 102 again. This may be determined based on one or more user settings, applications running, user input, randomized input, or so on. In one example, the processor 116 may determine if a "test mode" or "calibration mode" for the electronic device 100 is activated. During test mode or calibration mode, the electronic device 100 may selectively activate the haptic device 102 using predetermined inputs to then analyze the output produced by the haptic device 102. Test mode may be activated in instances where the computing device may not be in use by a user, such as if a lid for the device is closed, or if the device is in sleep or standby mode, or the like. With reference again to FIG. 7, if the haptic output device 102 is to be retested, the method 200 may return to operation 202 and the method 200 may repeat. If, however, the haptic output device 102 is not to be retested the method 200 may proceed to an end state 218 and the method may terminate.

CONCLUSION

The foregoing description has broad application. For example, while examples disclosed herein may focus on the haptic device incorporated into an electronic device, it should be appreciated that the concepts disclosed herein may equally apply to feedback mechanisms and methods for other devices and apparatuses. Accordingly, the discussion of any embodiment is meant only to be exemplary and is not intended to suggest that the scope of the disclosure, including the claims, is limited to these examples.

What is claimed is:

1. A method for operating a haptic output device for an electronic device comprising:
    sensing, by a force sensor, an input force applied to a movable surface of the haptic output device;
    causing a horizontal translation of the movable surface in response to the input force;
    sensing, by a feedback sensor, at least one of a movement velocity, acceleration, or distance of the horizontal translation of the movable surface;
    providing, by an adjustable biasing support disposed beneath and supporting the movable surface, a biasing force to return the movable surface to an original position in response to the horizontal translation;
    determining, by a processor, whether the at least one of the movement velocity, acceleration, or distance is accurate;
    if the at least one of the movement velocity, acceleration, or distance is not accurate, adjusting at least one characteristic of the haptic output device.

2. The method of claim 1, wherein the haptic output device is a track pad.

3. The method of claim 1, wherein adjusting at least one characteristic of the haptic output device comprises varying an input waveform of an actuator operably connected to the movable surface and configured to selectively move the movable surface.

4. The method of claim 3, wherein varying the input waveform of the actuator comprises adjusting at least one of a magnitude, duration, or shape of the input waveform.

5. The method of claim 1, wherein the at least one feedback sensor comprises an accelerometer, and the accelerometer is operably connected to the movable surface and configured to detect an acceleration of the horizontal translation of the movable surface.

6. The method of claim 1, wherein the at least one feedback sensor comprises an optical distance sensor.

7. The method of claim 1, wherein the at least one feedback sensor comprises a first feedback sensor and a second feedback sensor.

8. The method of claim 1, wherein the at least one sensor is configured to detect a change in capacitance as the movable surface moves from a first position to a second position during the horizontal translation.

9. The method of claim 1, wherein the at least one sensor is configured to detect a change in a magnetic field as the movable surface moves from a first position to a second position during the horizontal translation.

10. An electronic device comprising:
a processor;
a display screen in communication with the processor;
a track pad in communication with the processor including a selectively movable surface movable in at least one planar direction to provide output to a user;
a force sensor coupled to the track pad and configured to detect a force input to the selectively movable surface;
an actuator in communication with the processor and operably connected to the movable surface, the actuator being configured to cause a planar movement of the movable surface;
an adjustable biasing support disposed beneath the selectively movable surface and configured to:
support the selectively movable surface; and
provide a biasing force to return the selectively movable surface to an original position in response to the planar movement; and
a feedback system in communication with the processor including a feedback sensor; wherein
the feedback sensor determines at least one of a movement velocity, acceleration, or distance of the planar movement of the movable surface; and
the processor selectively adjusts at least one setting of the track pad based on the at least one of the movement velocity, acceleration, or distance.

11. The electronic device of claim 10, wherein the actuator selectively moves the movable surface between a first position and a second position in response to the detected force input.

12. The electronic device of claim 11, wherein the actuator selectively moves the movable surface based on an input signal, and the at least one setting of the track pad is the input signal.

13. The electronic device of claim 10, wherein the feedback sensor comprises an optical sensor configured to detect a movement distance.

14. The electronic device of claim 10, wherein the feedback sensor comprises an accelerometer.

15. A computing device comprising:
a horizontally movable surface;
a force sensor configured to detect a force input to the horizontally movable surface;
a feedback sensor configured to detect a horizontal movement characteristic of the movable surface;
an adjustable biasing support disposed beneath the horizontally movable surface and configured to:
support the horizontally movable surface; and
provide a biasing force to return the horizontally movable surface to an original position in response to horizontal movement of the horizontally movable surface;
a processor in communication with the feedback sensor and configured to:
compare the detected movement characteristic with a desired movement characteristic; and
when the detected movement characteristic does not substantially match the desired movement characteristic, adjust at least one input characteristic of the movable surface; wherein
the movement characteristic is at least one of a horizontal movement velocity, acceleration, or distance.

16. The computing device of claim 15, further comprising an actuator connected to the movable surface and in communication with the processor.

17. The computing device of claim 15, wherein the feedback sensor includes an accelerometer.

18. The computing device of claim 15, wherein the feedback sensor is configured to detect a change in capacitance as the movable surface moves from a first position to a second position.

19. The electronic device of claim 10, wherein the processor further adjusts the adjustable biasing support based on the at least one of the movement velocity, acceleration, or distance.

* * * * *